(12) United States Patent
Hsieh

(10) Patent No.: US 7,592,781 B2
(45) Date of Patent: Sep. 22, 2009

(54) CHARGER CONTROL CIRCUIT WITH AUTOMATIC POLARITY SELECTION

(75) Inventor: Ming-Chih Hsieh, Taipei Hsien (TW)

(73) Assignee: Hon Hai Precision Industry Co., Ltd., Tu-CHeng, Taipei Hsien (TW)

( * ) Notice: Subject to any disclaimer, the term of this patent is extended or adjusted under 35 U.S.C. 154(b) by 125 days.

(21) Appl. No.: 11/769,730

(22) Filed: Jun. 28, 2007

(65) Prior Publication Data

US 2008/0169787 A1   Jul. 17, 2008

(30) Foreign Application Priority Data

Jan. 11, 2007   (CN) .................. 2007 1 0200042

(51) Int. Cl.
    H02J 7/04      (2006.01)
    H02H 11/00     (2006.01)
(52) U.S. Cl. .................. 320/165; 361/246; 307/127
(58) Field of Classification Search .............. 320/165, 320/127, 128, 134, 136, 138; 307/138, 127; 361/245–246; 429/1
    See application file for complete search history.

(56) References Cited

U.S. PATENT DOCUMENTS 4,994,727 A * 2/1991 Yang .................. 320/105
2001/0033156 A1* 10/2001 Buono .................. 323/282

FOREIGN PATENT DOCUMENTS

CN          2852492          12/2006

* cited by examiner

Primary Examiner—Akm E Ullah
Assistant Examiner—Richard V Muralidar
(74) Attorney, Agent, or Firm—D. Austin Bonderer

(57) ABSTRACT

An exemplary charger control circuit includes an input port having a positive terminal and a negative terminal, an electrode control circuit, and an output port having a positive terminal and a negative terminal. The input port is connected to a source of power. The output port is connected to a load. The electrode switching circuit detects the electrode polarity of the input port and the output port for selectively coupling the positive terminals and the negative terminals of the two ports, and protecting the electrical equipment.

8 Claims, 2 Drawing Sheets

US 7,592,781 B2

CHARGER CONTROL CIRCUIT WITH AUTOMATIC POLARITY SELECTION

BACKGROUND OF THE INVENTION

1. Field of the Invention

The present invention relates to control circuits, and particularly to a charger control circuit with automatic terminal polarity selection.

2. Description of Related Art

The battery packs for portable power tools, outdoor tools and certain kitchen and domestic appliances may include rechargeable batteries, such as lithium, nickel cadmium, nickel metal hydride and lead-acid batteries, so that they can be recharged rather than replaced. Thereby a substantial cost saving is achieved.

Rechargeable batteries are charged by a DC battery charger. Generally, battery chargers include an alternating current (AC) to direct current (DC) (or DC to DC) adapter containing an AC to DC (or DC to DC) converter for generating a substantially constant current to charge the battery to a nominal battery voltage. The chargers also include an output port with a positive terminal and a negative terminal for connecting the charger to the depleted battery. When connecting the charger to the battery, the positive terminal of the output port must be connected to the positive terminal of the battery, and the negative terminal of the output port must be connected to the negative terminal of the battery or to ground so that the direct current is supplied to the positive terminal of the battery.

If the positive and negative terminals of the output port of the battery charger are reversely connected to the battery terminals, the battery charger will supply the direct current to the negative terminal of the battery. This situation can result in overheating of the battery charger, excess arcing between the connection cables and the terminals of the battery, and, in extreme cases, battery explosions.

What is needed, therefore, is a charger control circuit which can solve above problem.

SUMMARY OF THE INVENTION

In one aspect, the present invention relates to a control circuit which is capable of automatic terminal polarity selection for controlling current supplied from a source of power to a load. In one embodiment, the source of power is a battery charger and the load is a rechargeable battery. The charger control circuit includes: an input port with a positive terminal and a negative terminal connected to corresponding terminals of an output port of a battery charger for receiving direct current; an output port with two terminals connectable to the rechargeable battery; and a polarity detecting circuit coupled between the input port and the output port of the charger control circuit, wherein the polarity detecting circuit detects the polarity of the terminals of the output port of the charger control circuit, and provides direct current accordingly to the output port of the charger control circuit.

In another embodiment, the source of power is a DC power supply and the load is a battery charger. The charger control circuit includes: an input port with two terminals connected to the DC power supply; an output port with a positive terminal and a negative terminal connected to corresponding terminals of an input port of a battery charger for providing direct current; and a polarity detecting circuit coupled between the input port and the output port, wherein the polarity detecting circuit detects the polarity of the terminals of the input port, and receives direct current from the DC power supply.

Other advantages and novel features will become more apparent from the following detailed description when taken in conjunction with the accompanying drawings, in which:

DETAILED DESCRIPTION OF THE INVENTION

Figure 1:
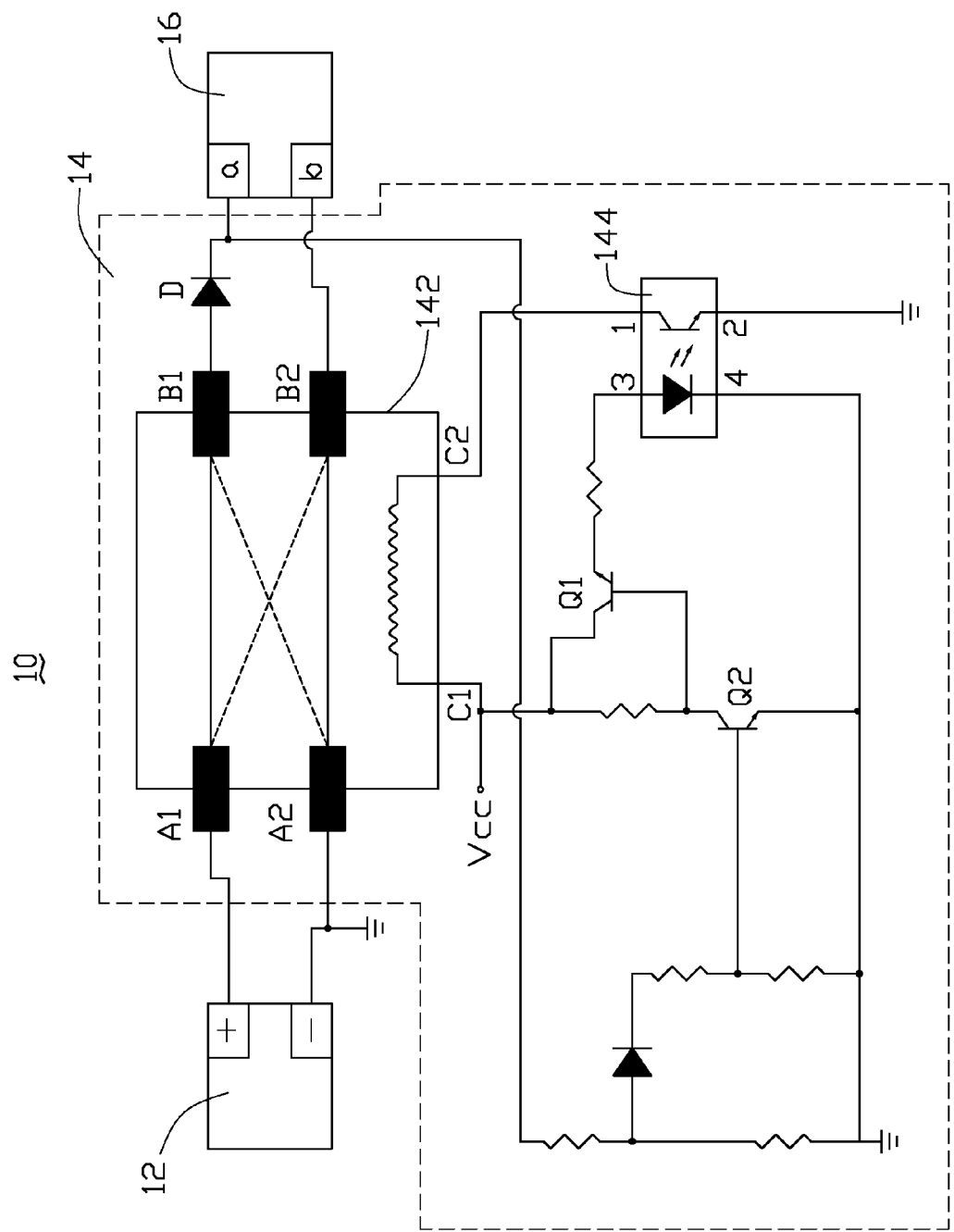
FIG. 1 is a circuit diagram of one embodiment of a charger control circuit in accordance with the present invention.

Referring to FIG. 1, a charger control circuit 10 in accordance with a preferred embodiment of the present invention includes an input port 12, a polarity detecting circuit 14, and an output port 16. The input port 12 defines a positive terminal + and a negative terminal −, and the terminals + and − are connected to corresponding terminals of an output port of a battery charger for receiving direct current. The output port 16 defines two terminals a and b, connected to a rechargeable battery. The polarity detecting circuit 14 is coupled between the input port 12 and the output port 16 for detecting the polarity of the terminals a and b, and providing direct current accordingly.

In this exemplary embodiment, the polarity detecting circuit 14 includes a relay-switch 142 with a switch element and a relay element, and a control circuit. The switch element of the relay-switch 142 defines two pairs of switch leads A1, A2 and B1, B2 in two opposite sides of the switch element, and the relay element of the relay-switch 142 defines two relay leads C1 and C2. The control circuit includes a first transistor Q1, a second transistor Q2, and a photocoupler 144 with a luminous element and an optical receiving block. Each of the transistors Q1 and Q2 has a base, a collector, and an emitter. The first transistor Q1 and second transistor Q2 are NPN transistors.

The switch leads A1 and A2 of the relay-switch 142 are respectively connected to the positive terminal + and negative terminal − of the input port 12. The switch lead B1 of the relay-switch 142 is connected to an anode of a diode D of which a cathode is connected to the terminal a of the output port 16, and the switch lead B2 of the relay-switch 142 is connected to the terminal b of the output port 16. An anode 1 of the optical receiving block is coupled to a power source Vcc via the relay element of the relay-switch 142, and a cathode 2 of the optical receiving block is grounded. An anode 3 of the luminous element is coupled to the emitter of the first transistor Q1, and a cathode 4 of the luminous element is grounded. The collector of the first transistor Q1 is connected to the power source Vcc, and the base of the first transistor Q1 is connected to the collector of the second transistor Q2. The collector of the second transistor Q2 is connected to the power source Vcc, the base of the second transistor Q2 is connected to a node between the diode D and the terminal a of the output port 16, and the emitter of the second transistor Q2 is grounded.

When the terminals a and b of the output port 16 are respectively connected to the positive terminal and the negative terminal of the rechargeable battery, the dump energy of the rechargeable battery turns on the second transistor Q2. The first transistor Q1 is turned off, and the optical receiving block of the photocoupler 144 is open. Therefore, the relay-switch 142 is turned off, and the switch leads A1 and A2 are respectively connected to B1 and B2. Then, the direct current flows in the proper polarity to the rechargeable battery.

When the terminals a and b of the output port 16 are respectively connected to the negative terminal and the positive terminal of the rechargeable battery. The second transistor Q2 is turned off. The first transistor Q1 is turned on, and the optical receiving block of the photocoupler 144 is shorted. Therefore, the relay-switch 142 is turned on, and the switch leads A1 and A2 are respectively connected to B2 and B1. Then, the direct current still flows in the proper polarity to the rechargeable battery.

Figure 2:
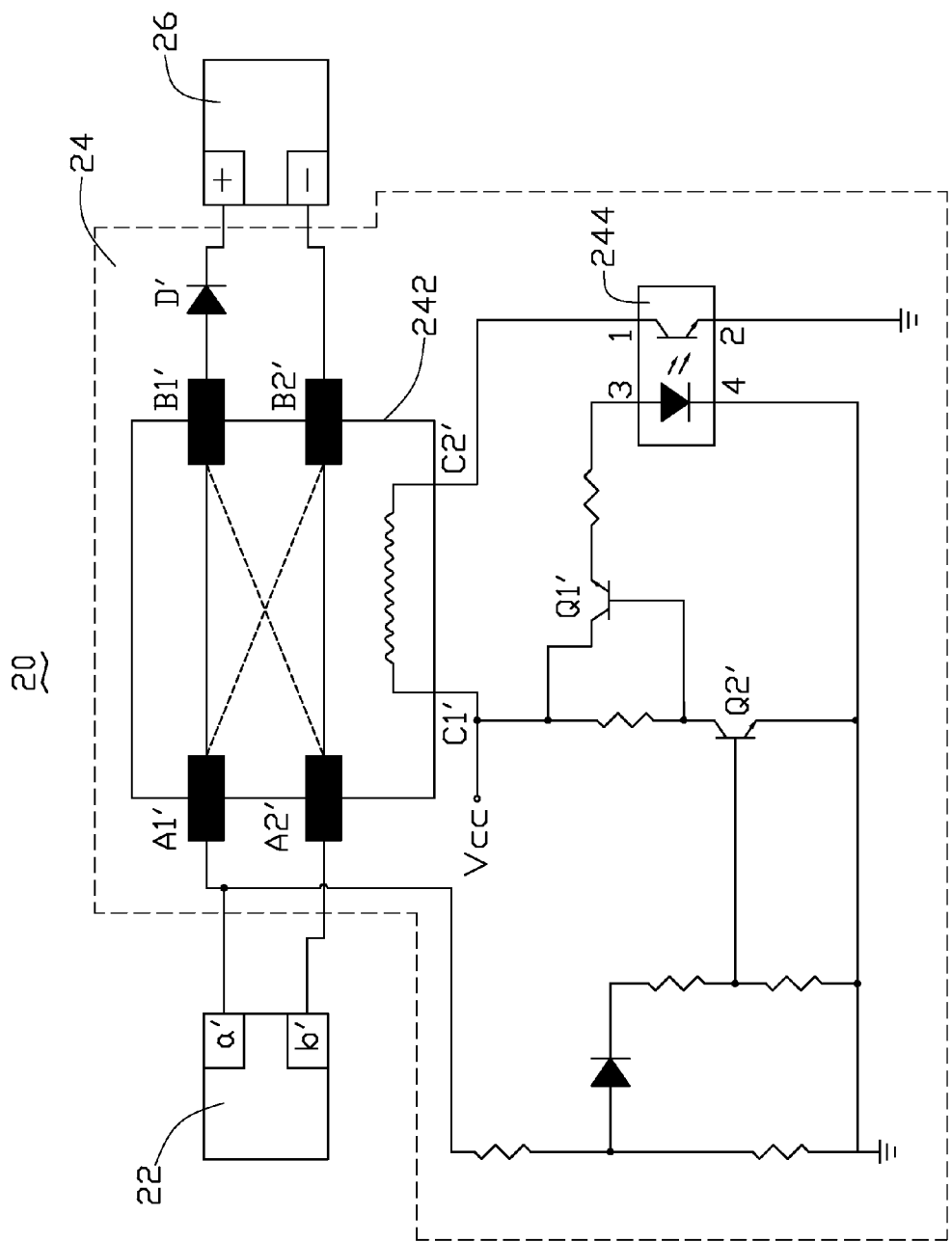
FIG. 2 is a circuit diagram of another embodiment of a charger control circuit in accordance with the present invention.

Referring to FIG. 2, a charger control circuit 20 in accordance with another embodiment of the present invention includes an input port 22, a polarity detecting circuit 24, and an output port 26. The input port 22 defines two terminals a' and b' connected to a DC power supply. The output port 26 defines a positive terminal + and a negative terminal −, and the terminals + and − are connected to corresponding terminals of an input port of a battery charger for providing direct current. The polarity detecting circuit 24 is coupled between the input port 22 and the output port 26 for detecting the polarity of the terminals a' and b', and receiving the direct current in the correct polarity from the terminals a' and b'.

The polarity detecting circuit 24 includes a relay-switch 242 with two pair of switch leads A1', A2', B1', B2', and two relay leads C1' and C2', a first transistor Q1', a second transistor Q2', and a photocoupler 244. The switch leads A1' and A2' of the relay-switch 242 are respectively connected to the terminals a' and b' of the input port 22. The switch lead B1' of the relay-switch 142 is connected to an anode of a diode D' of which a cathode is connected to the positive terminal + of the output port 26, and the switch lead B2' of the relay-switch 242 is connected to the negative terminal − of the output port 26. An anode 1 of the optical receiving block is coupled to a power source Vcc via the relay element of the relay-switch 242, and a cathode 2 of the optical receiving block is grounded. An anode 3 of the luminous element is coupled to the emitter of the first transistor Q1', and a cathode 4 of the luminous element is grounded. The collector of the first transistor Q1' is connected to the power source Vcc, and the base of the first transistor Q1' is connected to the collector of the second transistor Q2'. The collector of the second transistor Q2' is connected to the power source Vcc, the base of the second transistor Q2' is connected to a node between the terminal a' of the input port 22 and the switch leads A1' of the relay-switch 242, and the emitter of the second transistor Q2' is grounded.

Therefore, when the terminals a' and b' of the input port 22 are respectively connected to the positive terminal and the negative terminal of the DC power supply, the second transistor Q2' is turned on. The first transistor Q1' is turned off, and the optical receiving block of the photocoupler 244 is open. Therefore, the relay-switch 242 is turned off, and the switch leads A1' and A2' are respectively connected to B1' and B2'. Then, the direct current flows in the proper polarity to the battery charger. When the terminals a' and b' of the input port 22 are respectively connected to the negative terminal and the positive terminal of the DC power supply. The second transistor Q2' is turned off. The first transistor Q1' is turned on, and the optical receiving block of the photocoupler 244 is shorted. Therefore, the relay-switch 242 is turned on, and the switch leads A1' and A2' are respectively connected to B2' and B1'. Then, the direct current flows to the in the proper polarity to the rechargeable battery.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A charger control circuit comprising:

an input port having a positive terminal and a negative terminal connected to corresponding terminals of an output port of a battery charger for receiving direct current;

the output port having two terminals connected to a rechargeable battery; and a polarity detecting circuit coupled between the input port and the output port of the charger control circuit for detecting the polarity of the terminals of the output port of the charger control circuit to provide direct current of the proper polarity to the output port of the charger control circuit, wherein the polarity detecting circuit comprises a relay-switch with a switch element having a first switch lead and a second switch lead defined on one side thereof, and a third switch lead and a fourth switch lead defined on another side thereof for selectively connecting to the first and the second switch leads, and a relay element having two relay leads, and a control circuit connected to the relay leads to thereby selectively short the switch leads of the relay-switch for providing direct current to the rechargeable battery, wherein the first and second switch leads are respectively connected to the positive terminal and negative terminal of the input port, the third switch lead is connected to one terminal of the output port, the fourth switch lead is connected to another terminal of the output port;

wherein the control circuit comprises a first transistor, a second transistor, and a photocoupler with a luminous element and an optical receiving block, and wherein an anode of the optical receiving block is coupled to a power source via the relay element of the relay-switch, and a cathode of the optical receiving block is grounded, an anode of the luminous element is coupled to an emitter of the first transistor, a cathode of the luminous element is grounded, a collector of the first transistor is connected to the power source, a base of the first transistor is connected to a collector of the second transistor, a collector of the second transistor is connected to the power source, a base of the second transistor is coupled to a node between a diode and the corresponding terminal of the output port, and an emitter of the second transistor is grounded.

2. The charger control circuit as claimed in claim 1, further comprising a diode, an anode of the diode is connected to the third switch lead, a cathode of the diode is connected to said one terminal of the output port.

3. The charger control circuit as claimed in claim 1, wherein the first and second transistors are NPN transistors.

4. A charger control circuit comprising:

an input port with two terminals connected to a DC power supply;

an output port with a positive terminal and a negative terminal connected to corresponding terminals of an input port of a battery charger for providing direct current; and a polarity detecting circuit coupled between the input port and the output port for detecting the polarity of the terminals of the input port to transmit direct current from the input port to the output port in a proper polarity, wherein the polarity detecting circuit comprises a relay-switch with a switch element having a first switch lead and a second switch lead defined on one side thereof, and a third switch lead and a fourth switch lead defined on another side thereof for selectively connecting to the first and the second switch leads, and a relay element having two relay leads, and a control circuit connected to the relay leads to thereby selectively short the switch leads of the relay-switch for providing direct current to the rechargeable battery, wherein the first and second switch leads are respectively connected to two terminals of the input port, the third switch lead is connected to the positive terminal of the output port, the fourth switch lead is connected to the negative terminal of the output port;

wherein the control circuit comprises a first transistor, a second transistor, and a photocoupler with a luminous element and an optical receiving block, and wherein an anode of the optical receiving block is coupled to a power source via the relay element of the relay-switch, and a cathode of the optical receiving block is grounded, an anode of the luminous element is coupled to an emitter of the first transistor, a cathode of the luminous element is grounded, a collector of the first transistor is connected to the power source, a base of the first transistor is connected to a collector of the second transistor, a collector of the second transistor is connected to the power source, a base of the second transistor is coupled to a node between the first switch lead of the switch element of the relay-switch and the corresponding terminal of the input port, and an emitter of the second transistor is grounded.

5. The charger control circuit as claimed in claim 4, further comprising a diode, an anode of the diode is connected to the third switch lead, a cathode of the diode is connected to the positive terminal of the output port.

6. The charger control circuit as claimed in claim 4, wherein the first and second transistors are NPN transistors.

7. A charger control circuit comprising:

an input port having a positive terminal and a negative terminal;

an output port having a positive terminal and a negative terminal; and a polarity detecting circuit coupled between the input port and the output port, the polarity detecting circuit comprising first and second input terminals respectively connected to the positive and negative terminals of the input port, first and second output terminals respectively connected to the positive and negative terminals of the output port, and a control circuit connected to one of the input port and the output port to detect the polarity of the terminals of the one of the input port and the output port to control the first and second input terminals respectively connecting with the first and second output terminals in a proper polarity;

wherein the control circuit comprises a first transistor, a second transistor, and a photocoupler with a luminous element and an optical receiving block, and wherein an anode of the optical receiving block is coupled to a power source via the relay element of the relay-switch, and a cathode of the optical receiving block is grounded, an anode of the luminous element is coupled to an emitter of the first transistor, a cathode of the luminous element is grounded, a collector of the first transistor is connected to the power source, a base of the first transistor is connected to a collector of the second transistor, a collector of the second transistor is connected to the power source, a base of the second transistor is coupled to one of the positive terminals of the input and output ports, and an emitter of the second transistor is grounded.

8. The charger control circuit as claimed in claim 7, wherein the first and second transistors are NPN transistors.

* * * * *